F. G. & W. F. NIEDRINGHAUS.
MODE OF ATTACHING LIPS AND STRAINERS.
No. 186,433. Patented Jan. 23, 1877.
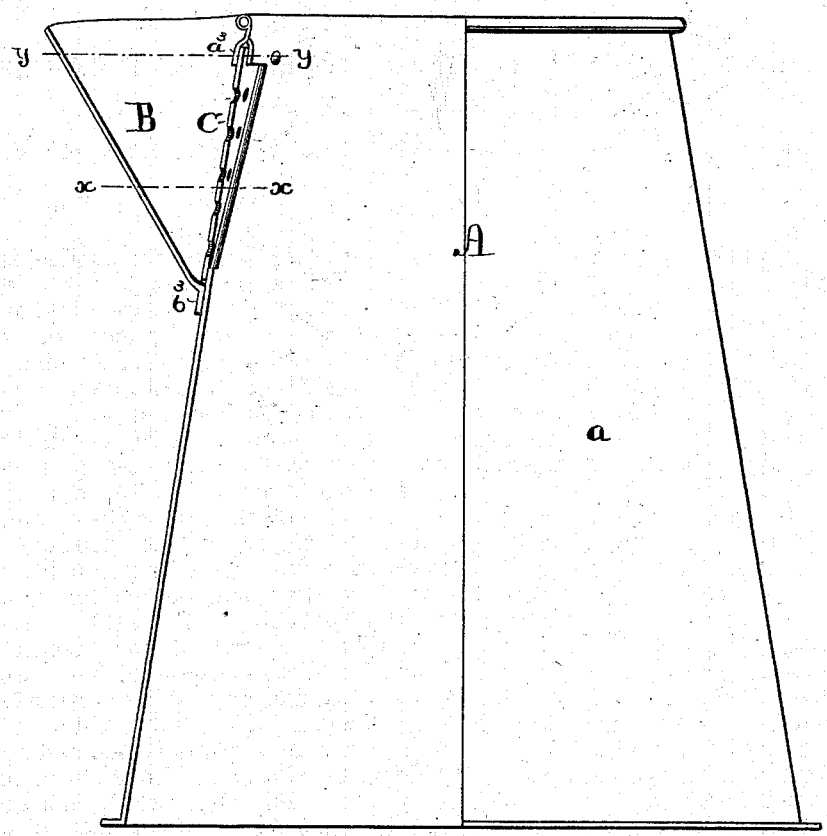
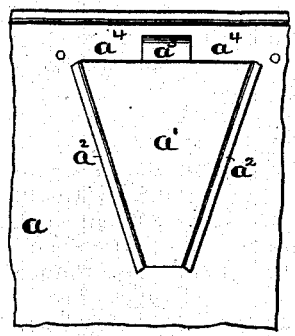
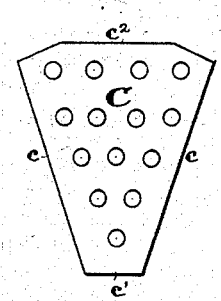
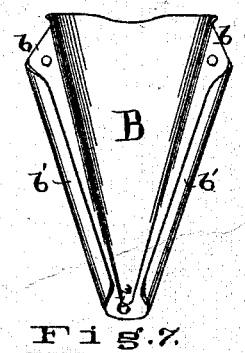
WITNESSES.
Saml. S. Boyd
Paul Bakewell
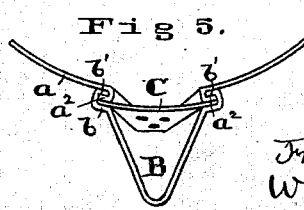
INVENTORS.
Frederick G. Niedringhaus,
William F. Niedringhaus,
By Chas. D. Moody,
their atty.

UNITED STATES PATENT OFFICE.

FREDERICK G. NIEDRINGHAUS AND WILLIAM F. NIEDRINGHAUS, OF ST. LOUIS, MISSOURI.

IMPROVEMENT IN MODES OF ATTACHING LIPS AND STRAINERS.

Specification forming part of Letters Patent No. 186,433, dated January 23, 1877; application filed December 12, 1876.

*To all whom it may concern:*

Be it known that we, FREDERICK G. NIEDRINGHAUS and WILLIAM F. NIEDRINGHAUS, of St. Louis, Missouri, have made a new and useful Improvement in the Mode of Attaching Lips and Strainers to Coffee-Boilers and similar vessels, of which the following is a full, clear, and exact description, reference being had to the annexed drawing, making part of this specification, in which—

Figure 1 is an elevation, partly in section, of a vessel embodying our improvement; Fig. 2, a view of that part of the vessel to which the lip is attached; Fig. 3, a view of the strainer; Fig. 4, a view of the lip from the inner side; Fig. 5, a cross-section on the line $x\,x$ of Fig. 1; Fig. 6, a section on the line $y\,y$ of Fig. 1, and Fig. 7 a view from the inner side of that part of the vessel that is immediately above the lip-opening.

Similar letters refer to similar parts.

In making coffee-boilers, milk-buckets, and similar vessels it has been customary to attach the lip to the body of the vessel by soldering. This method answers with vessels completed in the ordinary manner; but when they are finished by coating them with enamel, involving their subjection to a high degree of heat, the solder melts, and is insufficient for holding the lip in place. To overcome this difficulty, and to provide a mode by which the lip of a vessel subsequently finished with enamel can be economically and securely attached, is our present aim.

In the annexed drawing, A represents a vessel—such as a coffee-boiler—embodying our improvement. B represents the lip. The body $a$ of the vessel, as shown in Fig. 2, is first prepared by making an opening, $a^1$, in the wall of the vessel of the shape and size, or thereabout, of the intended lip. At the sides of this opening similar flanges $a^2\,a^2$ are respectively formed by turning the metal outward and back over the body $a$. Above the top of the opening a lip, $a^3$, beginning near the top of the vessel, projects outwardly, and then downward to the opening.

The lip B, in its general outline, is of the usual form. At its base, however, it is provided with a flange, $b$, extending on either side of the lip, laterally outward from the body of the lip, and then turning inward again, at $b^1\,b^1$, underneath the part $b\,b$. The flange $b$ also extends downward at $b^3$ at the lower end of the lip. C represents the strainer. It is formed of a separate piece of metal. Its shape and size are such as to cause its side edges $c\,c$ to coincide, when the strainer is in place, with the edges of the flanges $a^2\,a^2$. Its lower edge $c^1$ is even, or thereabout, with the bottom of the opening $a^1$, and its upper edge $c^2$ extends above the top of the opening.

The lip and strainer are attached as follows: The strainer is placed over the opening $a^1$ upon the flanges $a^2\,a^2$, its upper edge $c^2$ being slipped under the lip $a^3$, and upon the adjacent parts $a^4\,a^4$ of the vessel, and as shown in Figs. 1 and 5. The lip B is then attached by sliding it suitably upward, so as to cause the flanges $b\,b^1$ to interlock with the flanges $a^2\,a^2$, as shown in Figs. 1 and 5. The flanges $b\,b^1$ at the sides of the lip, and the flange $b^3$ at the lower end of the lip, are then closed down upon the body $a$, and two rivets, D D, are, preferably, passed through the upper ends, respectively, of the flanges $b\,b^1$ and the body $a$. By this means the various parts are firmly locked together. The vessel is enameled, in which process the joint around the lip is made tight, and the vessel finished.

The lip B can be attached independently of the strainer; and in such case the flanges $b\,b$ bear directly upon the flanges $a^2\,a^2$.

If desired, the opening $a^1$ may be so shaped as to bring the lower ends of the flanges $a^2\,a^2$ together.

What we claim is—

The combination of the vessel A, lip B, and strainer C, substantially as described.

F. G. NIEDRINGHAUS.
WM. F. NIEDRINGHAUS.

Witnesses:
SAML. S. BOYD,
CHAS. D. MOODY.